United States Patent

Masataki et al.

(10) Patent No.: US 11,081,105 B2
(45) Date of Patent: Aug. 3, 2021

(54) MODEL LEARNING DEVICE, METHOD AND RECORDING MEDIUM FOR LEARNING NEURAL NETWORK MODEL

(71) Applicant: NIPPON TELEGRAPH AND TELEPHONE CORPORATION, Chiyoda-ku (JP)

(72) Inventors: Hirokazu Masataki, Yokosuka (JP); Taichi Asami, Yokosuka (JP); Takashi Nakamura, Yokosuka (JP); Ryo Masumura, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 110 days.

(21) Appl. No.: 16/333,156

(22) PCT Filed: Sep. 5, 2017

(86) PCT No.: PCT/JP2017/031909
§ 371 (c)(1),
(2) Date: Mar. 14, 2019

(87) PCT Pub. No.: WO2018/051841
PCT Pub. Date: Mar. 22, 2018

(65) Prior Publication Data
US 2019/0244604 A1     Aug. 8, 2019

(30) Foreign Application Priority Data

Sep. 16, 2016    (JP) .............................. JP2016-181450

(51) Int. Cl.
*G10L 15/16*      (2006.01)
*G06N 99/00*     (2019.01)
(Continued)

(52) U.S. Cl.
CPC ............ *G10L 15/16* (2013.01); *G06F 40/216* (2020.01); *G06F 40/30* (2020.01); *G06N 3/049* (2013.01);
(Continued)

(58) Field of Classification Search
CPC ...... G10L 15/16; G10L 15/063; G10L 15/183
See application file for complete search history.

(56) References Cited

U.S. PATENT DOCUMENTS 10,515,301 B2 * 12/2019 Li ............................ G06N 3/08
2015/0347920 A1 * 12/2015 Medlock ............... G06F 3/0484
706/12

(Continued)

OTHER PUBLICATIONS

International Search Report dated Nov. 28, 2017 in PCT/JP2017/031909 filed Sep. 5, 2017.
(Continued)

*Primary Examiner* — Shaun Roberts
(74) *Attorney, Agent, or Firm* — Oblon, McClelland, Maier & Neustadt, L.L.P.

(57) ABSTRACT

A model learning device comprises: an initial value setting part that uses a parameter of a learned first model including a neural network to set a parameter of a second model including a neural network having a same network structure as the first model; a first output probability distribution calculating part that calculates a first output probability distribution including a distribution of an output probability of each unit on an output layer, using learning features and the first model; a second output probability distribution calculating part that calculates a second output probability distribution including a distribution of an output probability of each unit on the output layer, using learning features and the second model; and a modified model update part that obtains a weighted sum of a second loss function calculated from correct information and from the second output prob- (Continued)

ability distribution, and a cross entropy between the first output probability distribution and the second output probability distribution, and updates the parameter of the second model so as to reduce the weighted sum.

11 Claims, 12 Drawing Sheets

(51) Int. Cl.
  *G06N 3/08* (2006.01)
  *G10L 15/06* (2013.01)
  *G10L 15/065* (2013.01)
  *G10L 15/183* (2013.01)
  *G06F 40/30* (2020.01)
  *G06F 40/216* (2020.01)
  *G06N 3/04* (2006.01)

(52) U.S. Cl.
  CPC ............. *G06N 3/0454* (2013.01); *G06N 3/08* (2013.01); *G06N 99/00* (2013.01); *G10L 15/06* (2013.01); *G10L 15/063* (2013.01); *G10L 15/065* (2013.01); *G10L 15/183* (2013.01); *G10L 2015/0635* (2013.01)

(56) References Cited

U.S. PATENT DOCUMENTS

| | | | |
|---|---|---|---|
| 2016/0078339 A1* | 3/2016 | Li | G06N 7/005 706/20 |
| 2016/0307564 A1* | 10/2016 | Sethy | G10L 15/16 |
| 2017/0011738 A1* | 1/2017 | Senior | G10L 15/063 |
| 2017/0083829 A1* | 3/2017 | Kang | G06N 3/0454 |
| 2017/0243114 A1* | 8/2017 | Kurata | G06N 3/0472 |

OTHER PUBLICATIONS

Geoffrey Hinton, et al., "Deep Neural Networks for Acoustic Modeling in Speech Recognition," IEEE Signal Processing Magazine, vol. 29, No. 6, Nov. 2012, pp. 82-97.

Geoffrey Hinton, et al., "Distilling the Knowledge in a Neural Network," In Proceedings of Deep Learning and Representation Learning Workshop in NIPS 2014, 2014, pp. 1-9.

Tomáš Mikolov, et al., "Recurrent neural network based language model," In Proceedings of Interspeech 2010, Sep. 2010, pp. 1045-1048.

* cited by examiner

MODEL LEARNING DEVICE, METHOD AND RECORDING MEDIUM FOR LEARNING NEURAL NETWORK MODEL

TECHNICAL FIELD

The present invention relates to a model learning device for learning a neural model, a method therefor, and a program.

BACKGROUND ART

Various prior arts have been known as neural network model learning methods. For example, Non-patent literature 1 has been known as a prior art for an acoustic model learning method. FIG. 1 shows a typical neural network learning method (hereinafter also called Prior Art 1). A method of learning a neural network type acoustic model for speech recognition (hereinafter simply written as "acoustic model") using this learning method is described in the section "TRAINING DEEP NEURAL NETWORKS" in Non-patent literature 1.

A pair of the features (real vector) Q preliminarily extracted from each sample of learning data and a correct unit number $j_L$ corresponding to the features Q, and an appropriate initial model are prepared. For example, a neural network where a random number is allocated to each parameter, a neural network already learned with another learning data item can be used as the initial model. An output probability distribution calculating part 81 calculates an output probability distribution where the features Q of the learning data are input into a current model (the acoustic model on learning) and the output probability p(j) of each unit j on the output layer is arranged.

A model update part 82 calculates a loss function C from the correct unit number $j_L$ and the distribution of the output probability p(j), and updates the model so as to reduce the value of the loss function C. A process of calculating the output probability and of updating the model is repeated for each pair of the features Q of the learning data and the correct unit number $j_L$. The model at the time of completion of a predetermined number (typically, several tens of millions to several hundreds of millions) of repetitions is used as a learned acoustic model.

A method of transferring the knowledge included in the already learned neural network to a neural network to be newly learned (hereinafter also called transfer learning) is described in Non-patent literature 2 (hereinafter also called Prior Art 2). FIG. 2 shows a configuration of Prior Art 2.

This art is analogous to Prior Art 1 in that the pair of the features Q and the correct unit number $j_L$, and the initial model (described as "student model" in FIG. 2 for the sake of convenience) are preliminarily prepared. In addition, according to Prior Art 2, a teacher model that is an already learned neural network is preliminarily prepared. Prior Art 2 is different from Prior Art 1 in that a teacher output probability distribution calculating part 91 is included and the model update part 82 is replaced with a modified model update part 92. The teacher output probability distribution calculating part 91 inputs the features Q of learning data into the teacher model and calculates a distribution (hereinafter also simply called a teacher output probability distribution) of the output probability $p_1(j)$ where the probability of each unit j on the output layer is arranged. The difference from Prior Art 1 is that the temperature T is introduced into a calculation formula for obtaining the teacher output probability distribution. The temperature T is a preset parameter having a real value larger than zero. The modified model update part 92 is achieved by replacing the loss function C of the model update part 82 (see FIG. 1) with the following loss function C'.

[Formula 1]

$$C' = -(1-\alpha)\sum_j d_j \log p_j - \alpha \sum_j q_j \log p_j \quad (1)$$

This loss function C' is a weighted sum of the loss function C (first term) of the original model update part 82 and the cross entropy (second term) between the distribution of the teacher model output probability $q_j$ and the student model output probability $p_j$. The weight $\alpha$ is a preset parameter ranging from 0 to 1, inclusive.

According to Prior Art 2, an advantageous effect has been confirmed that the art can learn a high-speed model having an accuracy equivalent to that of a teacher model, by using, as the teacher model, a huge preliminarily learned model (having a high accuracy but a long calculation time), by adopting, as a student model, a small model initialized with a random number, and by setting the temperature T=2 and the weight $\alpha$=0.5. The huge model means a model that has a large number of intermediate layers in a neural network or has a large number of units on each intermediate layer.

In recent years, in the fields of speech recognition, character recognition, machine translation and the like, a method of improving the accuracy using "language model" representing the chain relationship between words has been actively discussed. The language model is a model that represents the transition probability, for words registered in a dictionary, from an immediately preceding word string to the next word. In recent years, an RNN (recurrent neural network) language model based on a neural network has been actively researched. Non-patent literature 3 has been known as a method of learning the RNN language model. FIG. 1 shows a typical neural network learning method.

Typically, a neural network where a random number is allocated to each parameter, and a neural network already learned with another learning data item can be used as the initial model. Adoption of words as the input and output of a neural network is achieved by associating a vocabulary of words used for input and output with each of units constituting an input layer and an output layer (one unit is associated with one word). For example, each output word is represented by the unit number j corresponding to each word, in actuality. The output probability distribution calculating part 81 sequentially inputs words constituting a word history h of the learning data into the current model, and calculates an output probability distribution where the output probability p(j) of each unit j on the output layer is arranged. The word history is a history (word string) of each word appearing immediately before a certain word when this word is to be recognized. In conformity with the usage of a language model, an appropriate corpus (an aggregation of text data items) may be used as the learning data. For example, in a case of a language model used for speech recognition, a corpus where text data items corresponding to speech may be used as the learning data. The learning data includes the word history (a word string obtained from the text data), and a word (next word) actually appearing after the word history. The next word is adopted as a correct word $w_t$ corresponding to the word history h.

The model update part 82 calculates the loss function C from the unit number $j_L$ on the output layer corresponding to the correct word $w_t$ and from the distribution of the output probability p(j), and updates the model so as to reduce the value of the loss function C. A process of updating the output probability calculation and model update is repeated for each pair of the word history h and the correct word $w_t$ in the learning data. The model at the time of completion of a predetermined number of repetitions is used as a learned language model.

According to Prior Art 2, an advantageous effect has been confirmed that the art can learn a high-speed model having an accuracy equivalent to that of a teacher model, by using, as the teacher model, a huge preliminarily learned model (having a high accuracy but a long calculation time), by adopting, as a student model, a small model initialized with a random number, and by setting the temperature T=2 and the weight α=0.5. The huge model means a model that has a large number of intermediate layers in a neural network or has a large number of units on each intermediate layer. For use of Prior Art 2 for learning the language model (FIG. 2), the process is performed as follows.

This art is analogous to Prior Art 1 in that the pair of the word history h and the correct word $w_t$, and the initial model (described as "student model" in FIG. 2 for the sake of convenience) are preliminarily prepared. In addition, according to Prior Art 2, a teacher model that is an already learned neural network is preliminarily prepared. Prior Art 2 is different from Prior Art 1 in that a teacher output probability distribution calculating part 91 is included and the model update part 82 is replaced with a modified model update part 92. The teacher output probability distribution calculating part 91 inputs the word history h of the learning data into the teacher model and calculates a distribution (hereinafter also simply called a teacher output probability distribution) of the output probability $p_1(j)$ where the probability of each unit j on the output layer is arranged. The difference from Prior Art 1 is that the temperature T is introduced into a calculation formula for obtaining the teacher output probability distribution. The temperature T is a preset parameter having a real value larger than zero. The modified model update part 92 is achieved by replacing the loss function C of the model update part 82 (see FIG. 1) with the following loss function C'.

[Formula 2]

$$C' = -(1-\alpha)\sum_j d_j \log p_j - \alpha \sum_j q_j \log p_j \quad (1)$$

This loss function C' is a weighted sum of the loss function C (first term) of the original model update part 82 and the cross entropy (second term) between the distribution of the teacher model output probability $q_j$ and the student model output probability $p_j$. The weight α is a preset parameter ranging from 0 to 1, inclusive.

PRIOR ART LITERATURE

Non-Patent Literature

Non-patent literature 1: Geoffrey Hinton, Li Deng, Dong Yu, George E. Dahl, Abdel-rahman Mohamed, Navdeep Jaitly, Andrew Senior, Vincent Vanhoucke, Patric Nguyen, Tara N. Sainath and Brian Kingsbury, "Deep Neural Networks for Acoustic Modeling in Speech Recognition," IEEE Signal Processing Magazine, Vol. 29, No. 6, pp. 82-97, 2012.

Non-patent literature 2: Geoffrey Hinton, Oriol Vinyals and Jeff Dean, "Distilling the Knowledge in a Neural Network," in Proceedings of Deep Learning and Representation Learning Workshop in NIPS 2014.

Non-patent literature 3: T. Mikolov, M. Karafiat, L. Burget, J. Cernocky, S. Khudanpur "Recurrent neural network based language model," in Proc. of Interspeech 2010.

SUMMARY OF INVENTION

Problems to be Solved by the Invention

However, according to Prior Art 1, when the learning data is small, a problem of over learning occurs and a neural network model having a lower accuracy (e.g., an acoustic model or a language model that has a low recognition accuracy) is learned in some cases. The over learning is a phenomenon that the learning data can be significantly accurately recognized but data that is not included in the learning data (input by a user when an actual speech recognition service is operated) cannot be recognized at all.

According to Prior Art 2, in transfer learning that learns a model having an accuracy equivalent to that of the teacher model and a short calculation time, it is required to prepare a huge teacher model (an accurate model having large numbers of intermediate layers and units on each intermediate layer but a long calculation time), for a neural network model to be generated (e.g., an acoustic model or a language model). Furthermore, since the calculation time is long, the learning cost for preparing the learning model is high. Moreover, data that cannot be correctly recognized with the teacher model in the learning data adversely affects the learning. Since the teacher model having the long calculation time is used, time is required to generate the neural network model.

The present invention has an object to provide a model learning device that can create a highly accurate neural network model without need of a huge teacher model, such as in Prior Art 2, and without causing over learning from small learning data, a method therefor, and a program.

Means to Solve the Problems

To solve the above problems, according to one aspect of the present invention, a model learning device comprises: an initial value setting part that uses a parameter of a learned first model including a neural network to set a parameter of a second model including a neural network having a same network structure as the first model; a first output probability distribution calculating part that calculates a first output probability distribution including a distribution of an output probability of each unit on an output layer, using features obtained from learning data and the first model; a second output probability distribution calculating part that calculates a second output probability distribution including a distribution of an output probability of each unit on the output layer, using features obtained from the learning data and the second model; and a modified model update part that calculates a second loss function from correct information corresponding to the learning data and from the second output probability distribution, calculates a cross entropy between the first output probability distribution and the second output probability distribution, obtains a weighted sum of the second loss function and the cross entropy, and updates the parameter of the second model so as to reduce the weighted sum.

To solve the above problems, according to another aspect of the present invention, a model learning device comprises: an initial value setting part that uses a parameter of a learned first acoustic model including a neural network to set a parameter of a second acoustic model including a neural network having a same network structure as the first acoustic model; a first output probability distribution calculating part that calculates a first output probability distribution including a distribution of an output probability of each unit on an output layer, using features obtained from a learning acoustic signal and the first acoustic model; a second output probability distribution calculating part that calculates a second output probability distribution including a distribution of an output probability of each unit on the output layer, using features obtained from a learning acoustic signal and the second acoustic model; and a modified model update part that calculates a second loss function from a correct unit number corresponding to the learning acoustic signal and from the second output probability distribution, calculates a cross entropy between the first output probability distribution and the second output probability distribution, obtains a weighted sum of the second loss function and the cross entropy, and updates the parameter of the second acoustic model so as to reduce the weighted sum.

To solve the above problems, according to still another aspect of the present invention, a model learning device comprises: an initial value setting part that uses a parameter of a learned first language model including a neural network to set a parameter of a second language model including a neural network having a same network structure as the first language model; a first output probability distribution calculating part that calculates a first output probability distribution including a distribution of an output probability of each unit on an output layer, using a word history that is a word string obtained from learning text data, and the first language model; a second output probability distribution calculating part that calculates a second output probability distribution including a distribution of an output probability of each unit on the output layer, using a word history that is a word string obtained from learning text data, and the second language model; and a modified model update part that calculates a second loss function from a correct word corresponding to the learning word history and from the second output probability distribution, calculates a cross entropy between the first output probability distribution and the second output probability distribution, obtains a weighted sum of the second loss function and the cross entropy, and updates the parameter of the second language model so as to reduce the weighted sum.

To solve the above problems, according to yet another aspect of the present invention, a model learning method comprises: an initial value setting step of using a parameter of a learned first model including a neural network to set a parameter of a second model including a neural network having a same network structure as the first model; a first output probability distribution calculating step of calculating a first output probability distribution including a distribution of an output probability of each unit on an output layer, using features obtained from learning data and the first model; a second output probability distribution calculating step of calculating a second output probability distribution including a distribution of an output probability of each unit on the output layer, using features obtained from the learning data and the second model; and a modified model update step of calculating a second loss function from correct information corresponding to the learning data and from the second output probability distribution, of calculating a cross entropy between the first output probability distribution and the second output probability distribution, of obtaining a weighted sum of the second loss function and the cross entropy, and of updating the parameter of the second model so as to reduce the weighted sum.

Effects of the Invention

The present invention exerts an advantageous effect capable of creating a highly accurate neural network model in a short time period without need of a huge teacher model equivalent to that in the prior art and without causing over learning from small learning data.

DETAILED DESCRIPTION OF THE EMBODIMENTS

Figure 1:
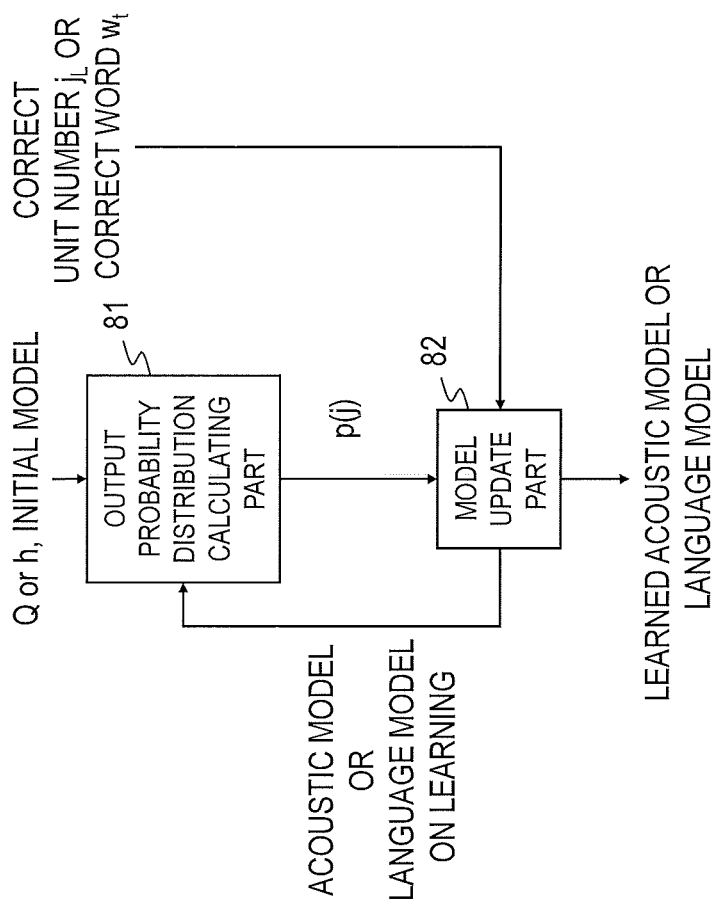
FIG. 1 is a functional block diagram of an acoustic model learning device according to a prior art.
Figure 2:
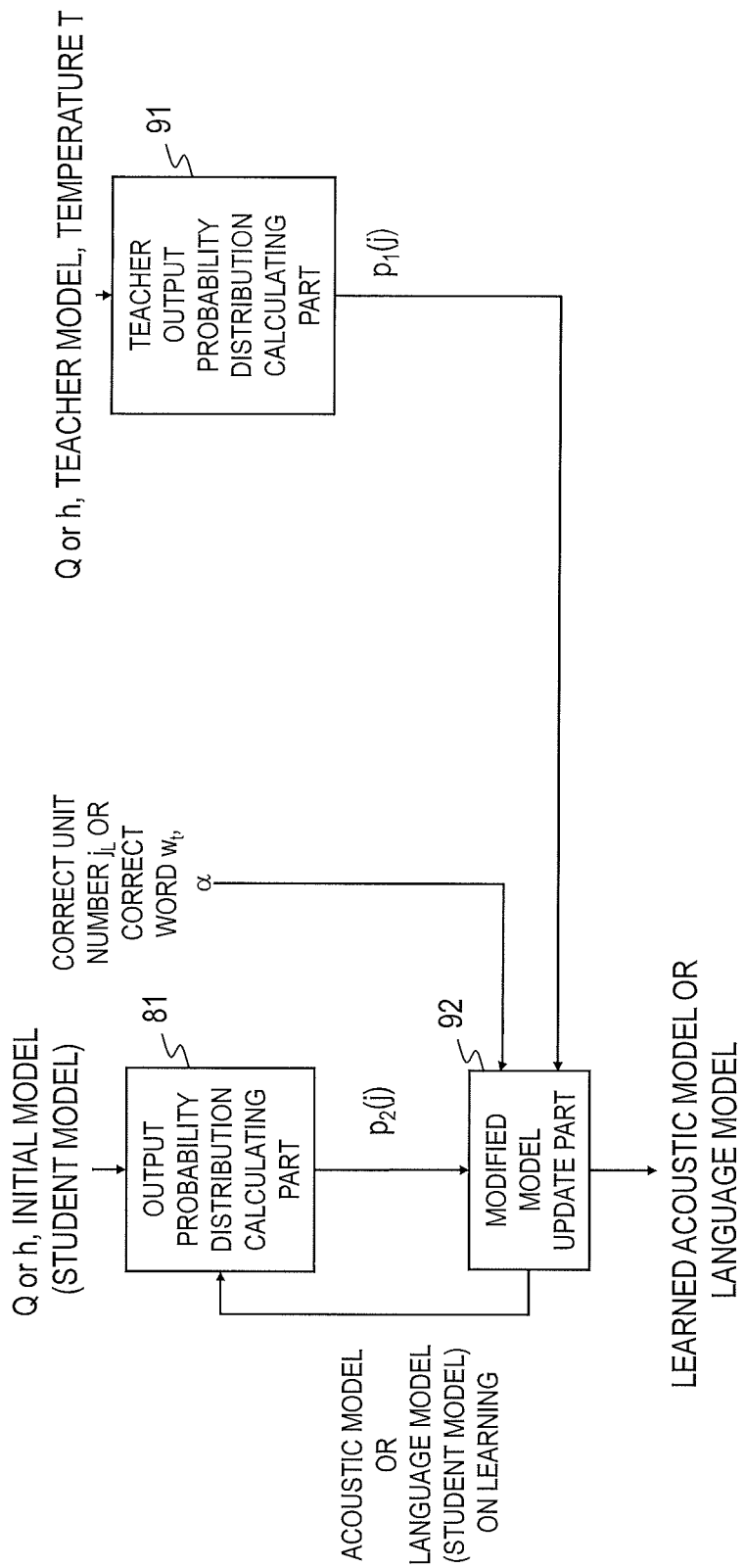
FIG. 2 is a functional block diagram of an acoustic model learning device according to a prior art.

Embodiments of the present invention are hereinafter described. In the drawings used in the following description, configuration parts having the same functions and steps performing the same processes are assigned the same symbols, and the redundant description is omitted. Processes performed in units of elements, such as of vectors or matrices, are assumed to be applied to all the elements of the vectors or the matrices, unless otherwise noted.

<Points of First Embodiment>

The point of this embodiment is to avoid the problem of over learning that is to occur when the learning data is small, by transferring knowledge from an acoustic model (e.g., a DNN acoustic model) having already learned with another learning data item. Specifically, a limitation where the teacher model and the student model have a neural network having an identical structure at the initial setting is imposed on the framework of Prior Art 2. The identicalness of the structure of the neural network means that other parameters and the like required according to the number of layers, the number of units, the activating function, and the type of NN to be used are common, for example. Under this limitation, an acoustic model having already been learned with another learning data item is used as the teacher model, and the initial value of the student model is set to be a copy of the teacher model. Such a configuration can perform learning so as to recognize the learning data correctly without any need of a huge teacher model equivalent to that in the prior art, and at the same time obtain, from the teacher model, a knowledge for proficient recognition of data that is not included in the learning data.

First Embodiment

Figure 3:
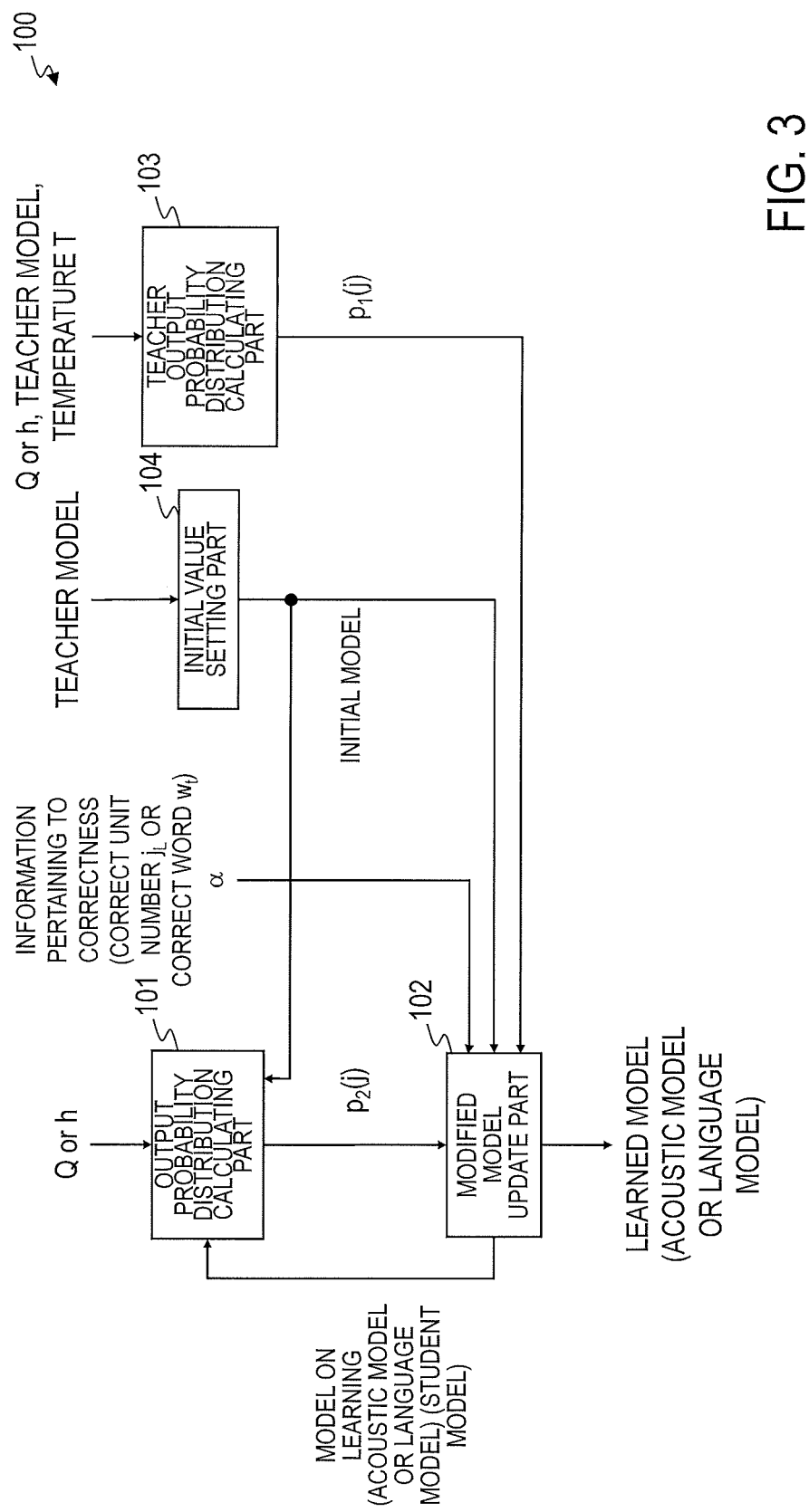
FIG. 3 is a functional block diagram of a model learning device according to first and fourth embodiments.
Figure 4:
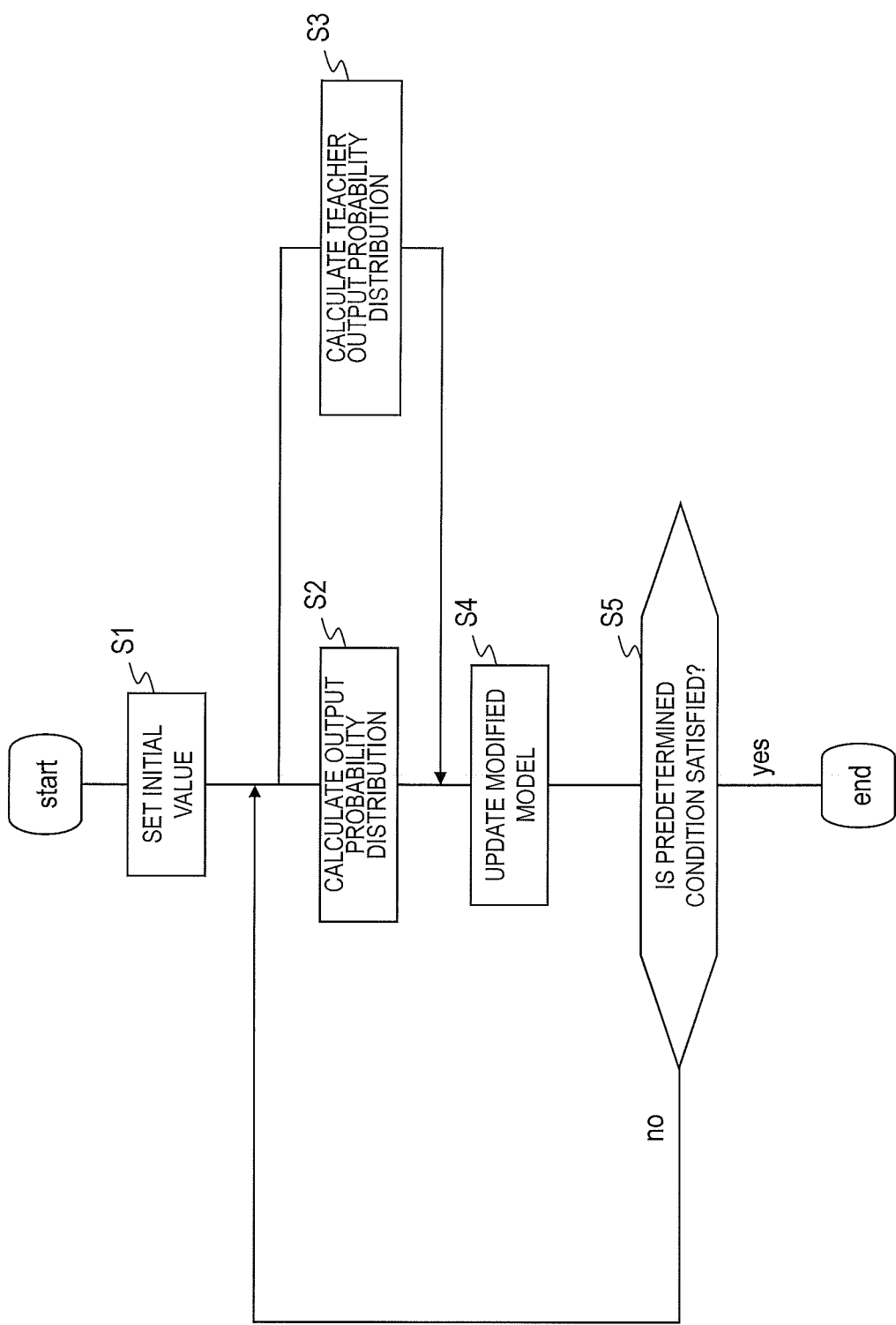
FIG. 4 shows an example of a processing flow of the model learning device according to the first and fourth embodiments.

FIG. 3 is a functional block diagram of a model learning device according to a first embodiment. FIG. 4 shows a processing flow thereof.

A model learning device 100 includes an output probability distribution calculating part 101, a modified model update part 102, a teacher output probability distribution calculating part 103, and an initial value setting part 104. A main difference from Prior Art 2 is that the initial value setting part 104 is added and, according to the addition, a base acoustic model (teacher model) and an acoustic model (student model) are limited to have the neural network having the identical structure.

<Initial Value Setting Part 104>
Input: teacher model
Output: initial model of student model
Process: use the parameters of a learned acoustic model (teacher model) including a neural network, and set the parameters of an acoustic model (student model) including a neural network having a same network structure as the acoustic model (teacher model) (S1). For example, a model that is a copy of the input parameters of the teacher model is created, and is output as the initial model of the student model. This process is performed only once at the start of learning. Prior Art 2 assumes the huge model as the teacher model and assumes the small model as the student model, while the teacher model and the student model in this embodiment have a completely identical structure. The process of the initial value setting part 104 allows a highly accurate acoustic model to be learned with smaller learning data than that in Prior Art 1.

<Output Probability Distribution Calculating Part 101>
Input: learning features Q, and student model (student model on learning, or initial model of the student model)
Output: the output probability distribution (the distribution of the output probability $p_2(j)$)

The output probability distribution calculating part 101 calculates the output probability distribution including the distribution of the output probability $p_2(j)$ of each unit on the output layer, using the features Q obtained from a learning acoustic signal and the student model (S2). Any of existing techniques may be used for the method of calculating the output probability $p_2(j)$. The optimal technique may be appropriately selected in conformity with the use environment and the like. For example, the calculation can be achieved by the method of Prior Art 1. In this case, first, the features Q are input into the student model, and the logit $x_j$ of the unit j on the output layer is obtained (see the following formula).

[Formula 3]

$$x_j = b_j + \sum_i y_i m_{ij} \quad (2)$$

$$y_j = \text{logistic}(x_j) = \frac{1}{1+e^{-x_j}} \quad (3)$$

Note that logistic( ) represents a logistic function, $b_j$ is the bias of the unit j, i represents the index of the unit on a lower layer, and $m_{ij}$ represents a weight for the connection from the unit i on the lower layer to the unit j. The learning features Q are used to obtain the input of the unit j on the input layer, and the student model includes $b_j$ and $m_{ij}$.

Next, the output probability $p_2(j)$ is obtained from the logit $x_j$ (see the following formula).

[Formula 4]

$$p_2(j) = \frac{\exp(x_j)}{\sum_k \exp(x_k)} \quad (4)$$

The model learning device 100 may adopt, as the input, a temporal-domain learning acoustic signal, and may include a frequency-domain conversion part and a features extraction part, which are not shown. For example, the frequency-domain conversion part, not shown, converts a time-domain learning acoustic signal into a frequency-domain signal, and outputs the converted signal. The features extraction part, not shown, extracts the learning features Q from the learning acoustic signal in the temporal domain or the frequency domain, and outputs the amount to the output probability distribution calculating part 101. The features may be, for example, the basic frequency, power, duration, formant frequency, spectrum, mel-frequency cepstral coefficient (MFCC) or the like.

<Teacher Output Probability Distribution Calculating Part 103>
Input: learning features Q, teacher model, and temperature T
Output: the output probability distribution (the distribution of the output probability $p_1(j)$)

The teacher output probability distribution calculating part 103 calculates the output probability distribution including the distribution of the output probability $p_1(j)$ of each unit on the output layer, using the features Q obtained from the learning acoustic signal, the teacher model and the temperature T (S3). Any of existing techniques may be used for the method of calculating the output probability $p_1(j)$. The optimal technique may be appropriately selected in conformity with the use environment and the like. For example, the calculation can be achieved by the method of Prior Art 2. In this case, the output probability $p_j(j)$ is represented by the following formula.

[Formula 5]

$$p_1(j) = \frac{\exp(x_j/T)}{\sum_k \exp(x_k/T)} \quad (5)$$

The method of calculating the logit $x_j$ is the same as that in the output probability distribution calculating part 101. However, the teacher output probability distribution calculating part 103 uses the teacher model instead of the student model. The temperature T is a preset parameter having a real value higher than zero. The higher T is set, the more closely the distribution of the output probability $p_1(j)$ approaches a uniform distribution (no information) and the smaller the degree of affecting after-mentioned update of the student model becomes. The temperature T is also called a smoothing parameter T.

<Modified Model Update Part 102>
Input: initial model, output probability distribution of output probability $p_1(j)$, output probability distribution of output probability $p_2(j)$, correct unit number $J_L$, and weight $\alpha$
Output: the acoustic model (student model) on learning, or the learned acoustic model The modified model update part 102 calculates a loss function $C_2$ from the correct unit number $j_L$ corresponding to the learning acoustic signal (corresponding to the learning features) and from the output probability $p_2(j)$ (see Formula (6)).

[Formula 6]

$$C_2 = -\sum_j d_j \log p_2(j) \quad (6)$$

Note that $d_j$ is one when j coincides with the correct unit number $j_L$, and is zero when j does not coincide.

Next, the modified model update part 102 calculates a cross entropy $C_1$ between the output probability distribution of the output probability $p_1(j)$ and the output probability distribution of the output probability $p_2(j)$ (the total sum of the products of the logarithms of the output probability $p_1(j)$ and the output probability $p_2(j)$) (see Formula (7)).

[Formula 7]

$$C_1 = -\sum_j p_1(j) \log p_2(j) \quad (7)$$

Furthermore, the modified model update part 102 obtains the weighted sum C between the loss function $C_2$ and the cross entropy $C_1$ (see Formula (8)).

$$C = (1-\alpha)C_2 + \alpha C_1 \quad (8)$$

The weight $\alpha$ is a preset parameter ranging from 0 to 1, inclusive.

Lastly, the modified model update part 102 updates the parameter of the student model so as to reduce the weighted sum C (S4).

The aforementioned S2 to S4 are repeated until a predetermined condition is satisfied (S5). When the predetermined condition is satisfied, the student model at the time is output as a learned acoustic model.

The predetermined condition may be, for example: any of (i) a case where the number of repetitions exceeds a certain number (e.g., several tens of millions to several hundreds of millions), and (ii) a case where the update amount falls below a predetermined value, for example, (ii-a) the total sum of the update amounts of all the parameters falls below a predetermined value, or (ii-b) all the parameters or some of update amounts fall below a set predetermined value.

<Advantageous Effects>
Use of the acoustic model created in this embodiment enables speech recognition to be performed at higher accuracy than in the prior art, and improves the usability of the user of the speech recognition system. Furthermore, the acoustic model can be created with the learning data smaller than in the prior art. Consequently, the amount of learning data required when the speech recognition system is developed can be reduced, and the time required for acoustic model learning can be reduced. Accordingly, the cost of creating the learning data during the development of the speech recognition system, and the cost of creating the acoustic model can be reduced.

Modified Example

According to this embodiment, the teacher output probability distribution calculating part 103 adopts the temperature T as an input. However, the temperature T is not necessarily adopted. For example, the calculation can be achieved by the method of Prior Art 1 without using the temperature T. However, the teacher output probability distribution calculating part 103 uses the teacher model instead of the student model when obtaining $x_j$.

<Points of Second Embodiment>
Points different from those in the first embodiment are mainly described.

Prior Art 2 has a problem in that data that cannot be correctly recognized by the teacher model in the learning data adversely affects the learning. Prior Art 2 learns the student model so as to emulate the dynamics of the teacher model. Consequently, data that is erroneously recognized by the teacher model is learned erroneously also by the student model. According to such problems, it is difficult to create a highly accurate acoustic model in a case where the learning data is small.

The point of this embodiment is that a teacher output probability calculating part considers the correct unit number $j_L$, thereby alleviating the problem of error in the teacher model to create an acoustic model having a higher accuracy. Specifically, the teacher output probability distribution and the correct unit number $j_L$ are checked to detect an error in the teacher model. If an error is detected, the temperature T is increased. Accordingly, the adverse effect of transfer of the error in the teacher model to the student model can be suppressed.

Second Embodiment

Points different from those in the first embodiment are mainly described.

Figure 5:
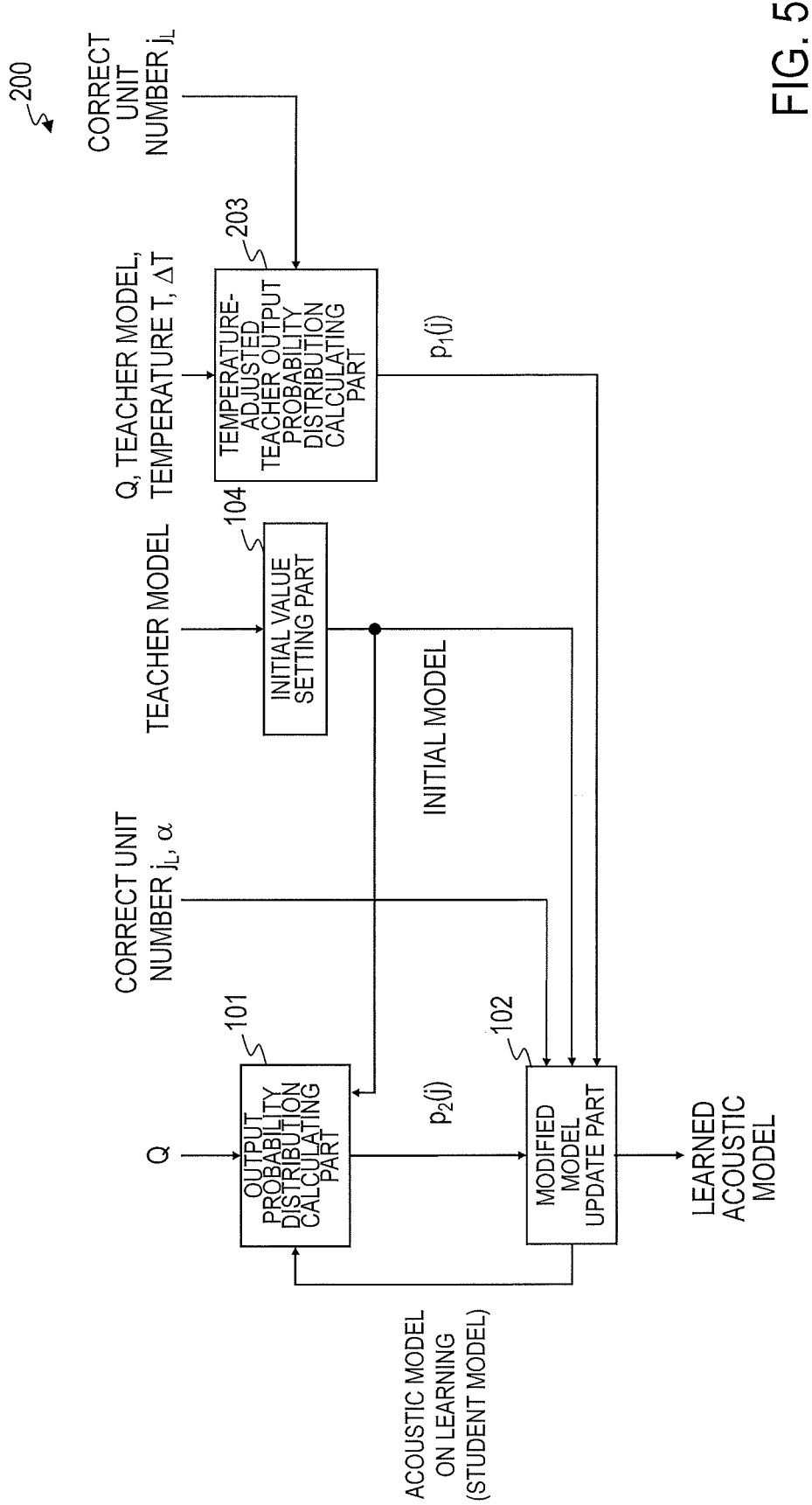
FIG. 5 is a functional block diagram of a model learning device according to a second embodiment.
Figure 6:
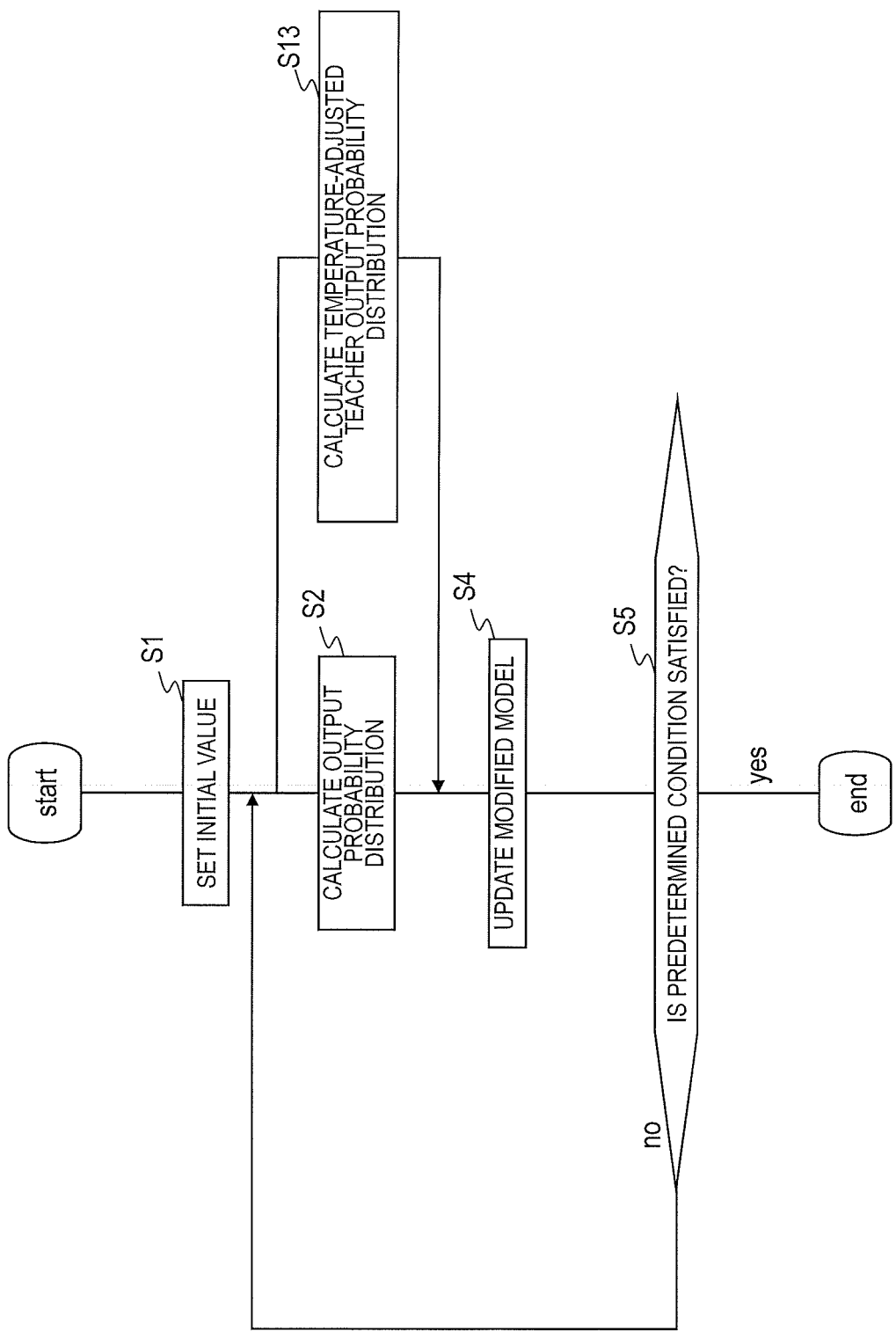
FIG. 6 shows an example of a processing flow of the model learning device according to the second embodiment.

FIG. 5 is a functional block diagram of a model learning device according to a second embodiment. FIG. 6 shows a processing flow thereof.

A model learning device 200 includes an output probability distribution calculating part 101, a modified model update part 102, a temperature-adjusted teacher output probability distribution calculating part 203, and an initial value setting part 104. A main difference from the first embodiment is that the teacher output probability distribution calculating part 103 is replaced with the temperature-adjusted teacher output probability distribution calculating part 203.

<Temperature-Adjusted Teacher Output Probability Distribution Calculating Part 203>
Input: features Q, teacher model, correct unit number $j_L$, temperature T, and temperature adjustment width $\Delta T$
Output: the output probability distribution (the distribution of the output probability $p_1(j)$)
Process:
The teacher output probability distribution calculating part 203 calculates the output probability distribution including the distribution of the output probability $p_1(j)$ of each unit on the output layer, using the features Q obtained from the learning acoustic signal, the teacher model, the temperature T and the temperature adjustment width ΔT (S13).

For example, the teacher output probability distribution calculating part 203 inputs the input features Q into the teacher model, and calculates the logit $x_j$ of Formula (2).

Next, the teacher output probability distribution calculating part 203 identifies the output unit number K having the highest logit $x_j$ value.

[Formula 8]

$$K = \operatorname*{argmax}_{j} x_j \quad (11)$$

Furthermore, the teacher output probability distribution calculating part 203 determines whether K is equal to the correct unit number $j_L$ or not. If K is equal to the correct unit number $j_L$, the distribution of the output probability $p_1(j)$ is calculated by the following Formula (12) using the temperature T as it is, and is output. If K is different from the correct unit number $j_L$, the temperature T is replaced with T+ΔT, and the distribution of the output probability $p_1(j)$ is calculated by the following Formula (12) and is output.

[Formula 9]

$$p_1(j) = \frac{\exp(x_j/T_1)}{\sum_k \exp(x_k/T_1)} \quad (12)$$

$$T_1 = \begin{cases} T & (K = j_L) \\ T + \Delta T & (K \neq j_L) \end{cases}$$

<Advantageous Effects>

As described above, the higher the temperature T is set, the more closely the distribution of the output probability $p_1(j)$ in Formula (12) approaches a uniform distribution (no information) and the smaller the degree of affecting the update of the student model becomes. Consequently, according to such a process, even in case the teacher model has an error (K is different from the correct unit number $j_L$), the adverse effects of the error on the learning can be suppressed.

The temperature adjustment width ΔT is a preset parameter, and is set to, for example, a value of about ΔT=5 to 10.

<Points of Third Embodiment>

Points different from those in the second embodiment are mainly described.

In this embodiment, to solve the problem described in the second embodiment (the problem of the error of the teacher model), for example, the error of the teacher model is detected by checking the distribution of the output probability $p_1(j)$ and the correct unit number $j_L$, and if the error is present, the probability of the unit corresponding to the correct unit number $j_L$ is increased. Accordingly, the adverse effect of transfer of the error in the teacher model to the student model can be suppressed.

Figure 7:
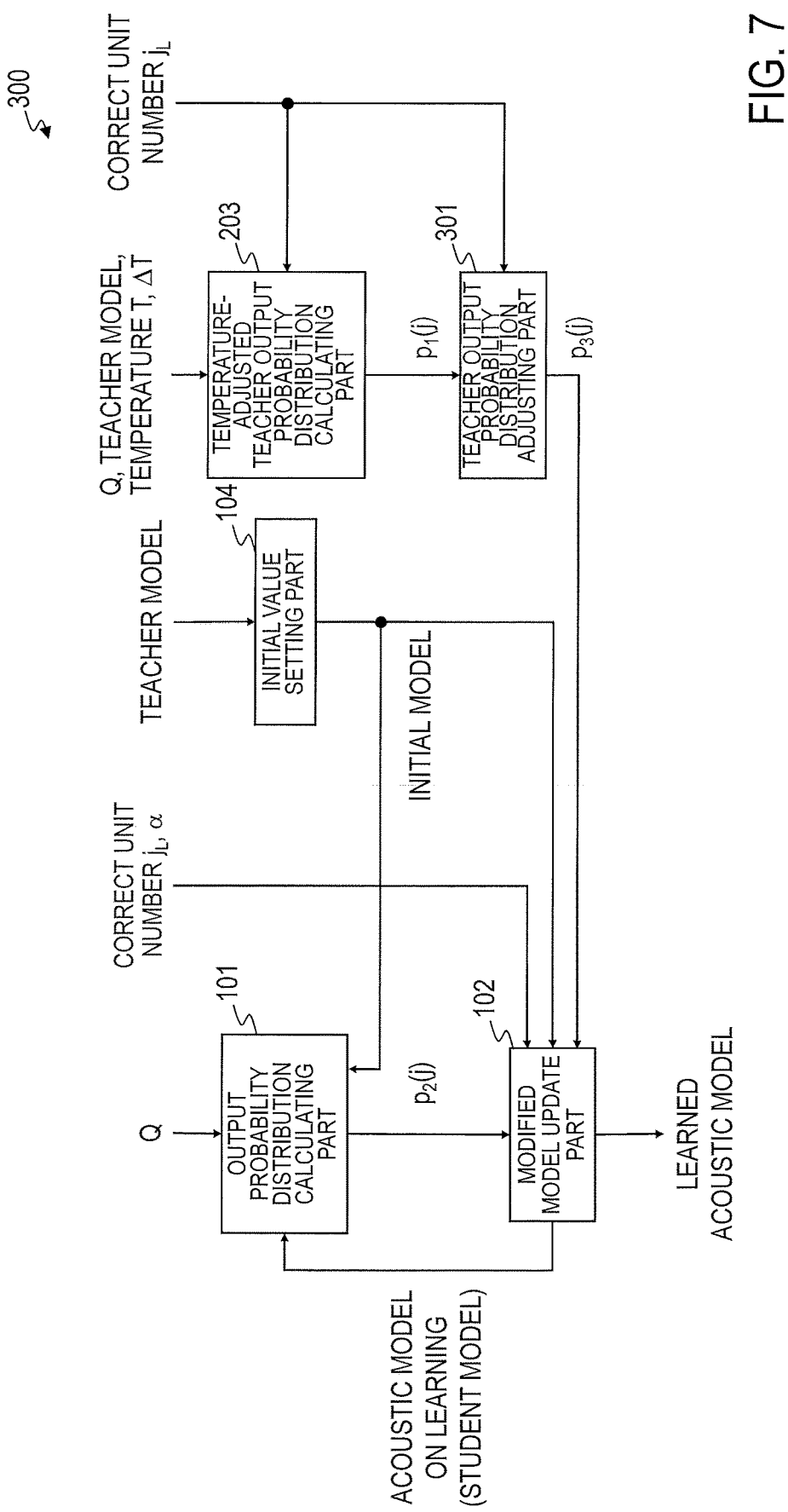
FIG. 7 is a functional block diagram of a model learning device according to a third embodiment.
Figure 8:
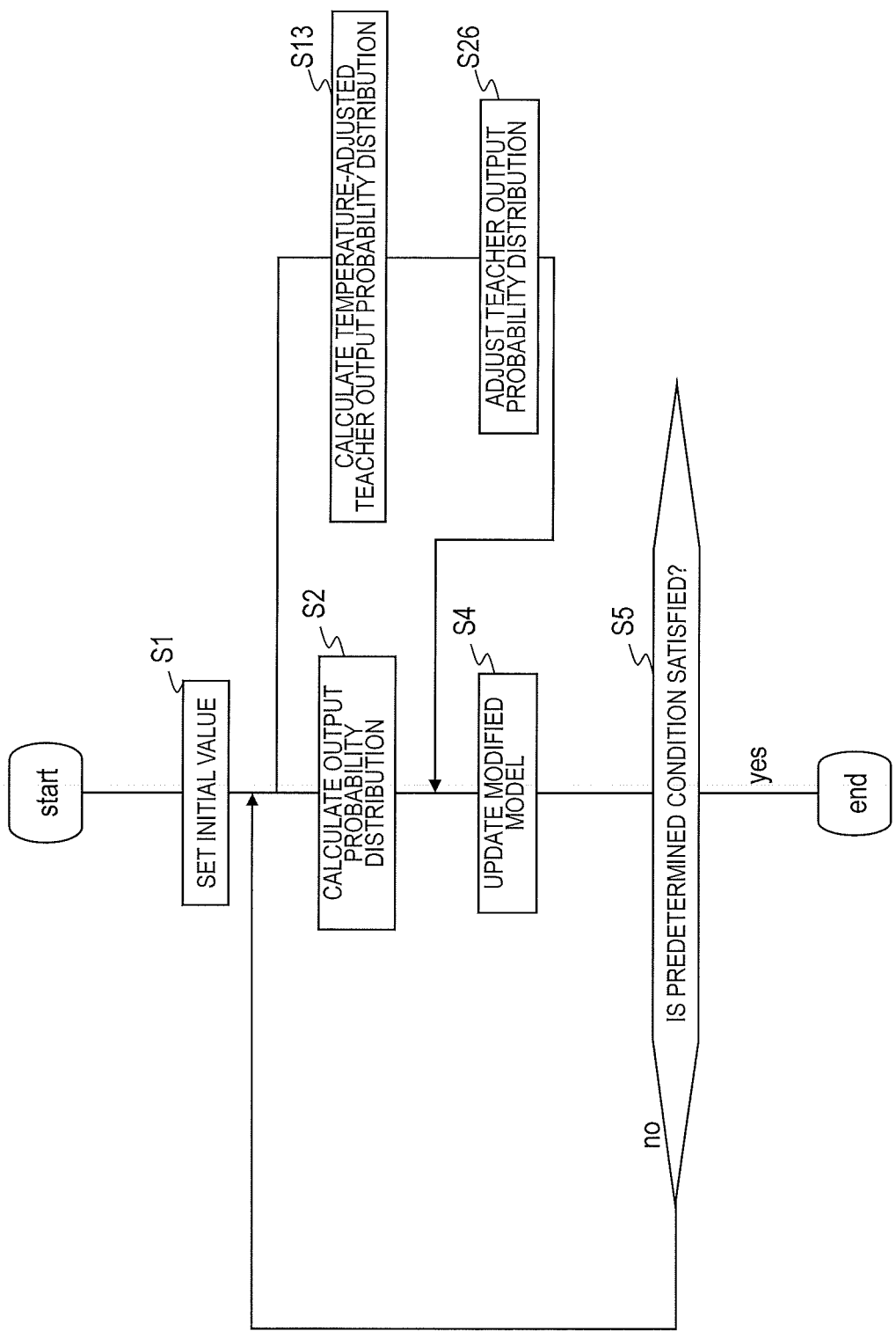
FIG. 8 shows an example of a processing flow of the model learning device according to the third embodiment.

FIG. 7 is a functional block diagram of a model learning device according to a third embodiment. FIG. 8 shows a processing flow thereof.

A model learning device 300 includes an output probability distribution calculating part 101, a modified model update part 102, a temperature-adjusted teacher output probability distribution calculating part 203, an initial value setting part 104, and a teacher output probability distribution adjusting part 301. The main difference from the second embodiment is that the teacher output probability distribution adjusting part 301 is added. Note that a configuration may be adopted where the temperature-adjusted teacher output probability distribution calculating part 203 is replaced with the teacher output probability distribution calculating part 103 (without use of the idea of the second embodiment).

<Teacher Output Probability Distribution Adjusting Part 301>

Input: distribution of output probability $p_1(j)$, and correct unit number $j_L$ Output: the corrected distribution of output probability $p_3(j)$ Process:

The teacher output probability distribution adjusting part 301 adjusts the distribution of the output probability $p_1(j)$ using the correct unit number $j_L$, and obtains the corrected distribution of the output probability $p_3(j)$.

The teacher output probability distribution adjusting part 301 refers to the distribution of the output probability $p_1(j)$, and identifies the output unit number K with which the output probability $p_1(j)$ is the maximum.

[Formula 10]

$$K = \operatorname*{argmax}_{j} p_1(j) \quad (21)$$

This K has the same value as that obtained in the temperature-adjusted teacher output probability distribution calculating part 203. Accordingly, the temperature-adjusted teacher output probability distribution calculating part 203 may output K, which may be adopted as the input of the teacher output probability distribution adjusting part 301. If the configuration where the temperature-adjusted teacher output probability distribution calculating part 203 is replaced with the teacher output probability distribution calculating part 103 is adopted, the output unit number K with which the output probability $p_1(j)$ is the maximum is required to be identified by Formula(21) or the like.

Furthermore, the teacher output probability distribution adjusting part 301 determines whether K is equal to the correct unit number $j_L$ or not. If K is equal to the correct unit number $j_L$, the distribution of the output probability $p_1(j)$ is output, as it is, as the corrected distribution of the output probability $p_3(j)$.

If K is different from the correct unit number $j_L$, the distribution of the output probability where the output probability $p_1(K)$ of the K-th output unit and the output probability $p_1$th) of the output unit corresponding to the correct unit number $j_L$ are replaced with each other in the distribution of the output probability $p_1(j)$ is created as the corrected distribution of the output probability $p_3(j)$, which is then output.

<Advantageous Effects>

The above process secures that in the corrected distribution of the output probability, the probability value corresponding to the correct unit number $j_L$ must be the maximum. Consequently, the problem of transfer of the error of a teacher model can be prevented.

<Points of Fourth Embodiment>

Points different from those in the first embodiment are mainly described.

The point of this embodiment is to avoid the problem of over learning that is to occur when the learning data is small, by transferring knowledge from a language model having already learned with another learning data item. Specifically, a limitation where the teacher model and the student model have a neural network having an identical structure at the initial setting is imposed on the framework of Prior Art 2. Under this limitation, a language model having already been learned with another learning data item is used as the teacher model, and the initial value of the student model is copied to the data of the teacher model. Such a configuration can perform learning so as to recognize the learning data correctly without any need of a huge teacher model equivalent to that of the Prior Art 2, and at the same time obtain, from the teacher model, a knowledge for proficient recognition of data that is not included in the learning data.

Fourth Embodiment

FIG. 3 is a functional block diagram of a model learning device according to a fourth embodiment. FIG. 4 shows a processing flow thereof.

In this embodiment, instead of the acoustic model (e.g., a DNN acoustic model), a language model (e.g., an RNN language model) is learned using a neural network.

A model learning device 100 includes an output probability distribution calculating part 101, a modified model update part 102, a teacher output probability distribution calculating part 103, and an initial value setting part 104. A main difference from the first embodiment is that instead of the acoustic model, the language model is learned. Based on this difference, instead of the features Q, a word history h is adopted as the input, and instead of the correct unit number $j_L$, a correct word $w_t$ is adopted as the input.

<Initial Value Setting Part 104>
Input: teacher model
Output: initial model of student model
Process: use the parameters of a learned language model (teacher model) including a neural network, and set the parameters of a language model (student model) including a neural network having a same network structure as the language model (teacher model) (S1). For example, a model that is a copy of the input parameters of the teacher model is created, and is output as the initial model of the student model. This process is performed only once at the start of learning. Prior Art 2 assumes the huge model as the teacher model and assumes the small model as the student model, while the teacher model and the student model in this embodiment have a completely identical structure. The process of the initial value setting part 104 allows a highly accurate language model to be learned with smaller learning data than that in Prior Art 1.

<Output Probability Distribution Calculating Part 101>
Input: learning word history h, and student model (student model on learning, or initial model of the student model)
Output: the output probability distribution (the distribution of the output probability $p_2(j)$)

The output probability distribution calculating part 101 calculates the output probability distribution including the distribution of the output probability $p_2(j)$ of each unit on the output layer, using the learning word history h and the student model (S2). Any of existing techniques may be used for the method of calculating the output probability $p_2(j)$. The optimal technique may be appropriately selected in conformity with the use environment and the like. For example, the calculation can be achieved by the method of Prior Art 1. In this case, first, the word history h is input into the student model, and the logit $x_j$ of the unit j on the output layer is obtained (see the following formula).

[Formula 11]

$$x_j = b_j + \sum_i y_i m_{ij} \quad (2)$$

$$y_j = \text{logistic}(x_j) = \frac{1}{1+e^{-x_j}} \quad (3)$$

Note that logistic( ) represents a logistic function, $b_j$ is the bias of the unit j, i represents the index of the unit on a lower layer, and $m_{ij}$ represents a weight for the connection from the unit i on the lower layer to the unit j. The learning word history h is used to obtain the input of the unit j on the input layer, and the student model includes $b_1$ and $m_{ij}$.

Next, the output probability $p_2(j)$ is obtained from the logit $x_j$ (see the following formula).

[Formula 12]

$$p_2(j) = \frac{\exp(x_j)}{\sum_k \exp(x_k)} \quad (4)$$

<Teacher Output Probability Distribution Calculating Part 103>
Input: learning word history h, teacher model, and temperature T
Output: the output probability distribution (the distribution of the output probability $p_1(j)$)

The teacher output probability distribution calculating part 103 calculates the output probability distribution including the distribution of the output probability $p_1(j)$ of each unit on the output layer, using the learning word history h, the teacher model and the temperature T (S3). Any of existing techniques may be used for the method of calculating the output probability $p_1(j)$. The optimal technique may be appropriately selected in conformity with the use environment and the like. For example, the calculation can be achieved by the method of Prior Art 2. In this case, the output probability $p_1(j)$ is represented by the following formula.

[Formula 13]

$$p_1(j) = \frac{\exp(x_j/T)}{\sum_k \exp(x_k/T)} \quad (5)$$

The method of calculating the logit $x_j$ is the same as that in the output probability distribution calculating part 101. However, the teacher output probability distribution calculating part 103 uses the teacher model instead of the student model. The temperature T is a preset parameter having a real value higher than zero. The higher T is set, the more closely the distribution of the output probability $p_1(j)$ approaches a uniform distribution (no information) and the smaller the degree of affecting after-mentioned update of the student model becomes. The temperature T is also called a smoothing parameter T.

<Modified Model Update Part 102>
Input: initial model, output probability distribution of output probability $p_1(j)$,
output probability distribution of output probability $p_2(j)$,
correct word $w_t$, and weight α

Output: language model (student model) on learning, or the learned language model The modified model update part 102 calculates a loss function $C_2$ from the unit number $j_L$ corresponding to the correct word $w_t$ corresponding to the learning word history h and from the output probability $p_2(j)$ (see Formula (6)).

[Formula 14]

$$C_2 = -\sum_j d_j \log p_2(j) \qquad (6)$$

Note that $d_j$ is one when j coincides with the unit number $j_L$ corresponding to the correct word $w_t$, and is zero when j does not coincide.

Next, the modified model update part 102 calculates a cross entropy $C_1$ between the output probability distribution of the output probability $p_1(j)$ and the output probability distribution of the output probability $p_2(j)$ (the total sum of the products of the logarithms of the output probability $p_1(j)$ and the output probability $p_2(j)$) (see Formula (7)).

[Formula 15]

$$C_1 = -\sum_j p_1(j) \log p_2(j) \qquad (7)$$

Furthermore, the modified model update part 102 obtains the weighted sum C between the loss function $C_2$ and the cross entropy $C_1$ (see Formula (8)).

$$C = (1-\alpha)C_2 + \alpha C_1 \qquad (8)$$

The weight $\alpha$ is a preset parameter ranging from 0 to 1, inclusive.

Lastly, the modified model update part 102 updates the parameter of the student model so as to reduce the weighted sum C (S4).

The aforementioned S2 to S4 are repeated until a predetermined condition is satisfied (S5). When the predetermined condition is satisfied, the student model at the time is output as a learned language model.

The predetermined condition may be, for example: any of (i) a case where the number of repetitions exceeds a certain number (e.g., several tens of millions to several hundreds of millions), and (ii) a case where the update amount falls below a predetermined value, for example, (ii-a) the total sum of the update amounts of all the parameters falls below a predetermined value, or (ii-b) all the parameters or some of update amounts fall below a set predetermined value.

<Advantageous Effects>

Use of the language model created in this embodiment can construct a language model more accurate than in the prior art. For example, in a case where the language model is used for speech recognition, speech recognition can be performed at higher accuracy than in the prior art, and the usability of the user of the speech recognition system is improved. Furthermore, the language model can be created with the learning data smaller than in the prior art. Consequently, the amount of learning data required when the speech recognition system is developed can be reduced, and the time required for language model learning can be reduced. Accordingly, the cost of creating the learning data during the development of the speech recognition system, and the cost of creating the language model can be reduced.

Modified Example

According to this embodiment, the teacher output probability distribution calculating part 103 adopts the temperature T as an input. However, the temperature T is not necessarily adopted. For example, the calculation can be achieved by the method of Prior Art 1 without using the temperature T. However, the teacher output probability distribution calculating part 103 uses the teacher model instead of the student model when obtaining $x_j$.

This embodiment may be combined with the second or third embodiment. The language model may be learned using the word history instead of the features and using the correct word instead of the correct unit number.

<Points of Fifth Embodiment>

Points different from those in the fourth embodiment are mainly described.

The fourth embodiment includes a modified model update part as described in Reference Document 1.

(Reference Document 1) T. Mikolov, S. Kombrink, L. Burget, J. H. Cernocky and S. Khudanpur, "Extensions of recurrent neural network language model," in Proc. of ICASSP 2011.

The modified model update part calculates the cross entropy separately for the word and for the class, and updates the parameters so as to reduce the respective loss functions.

Figure 9:
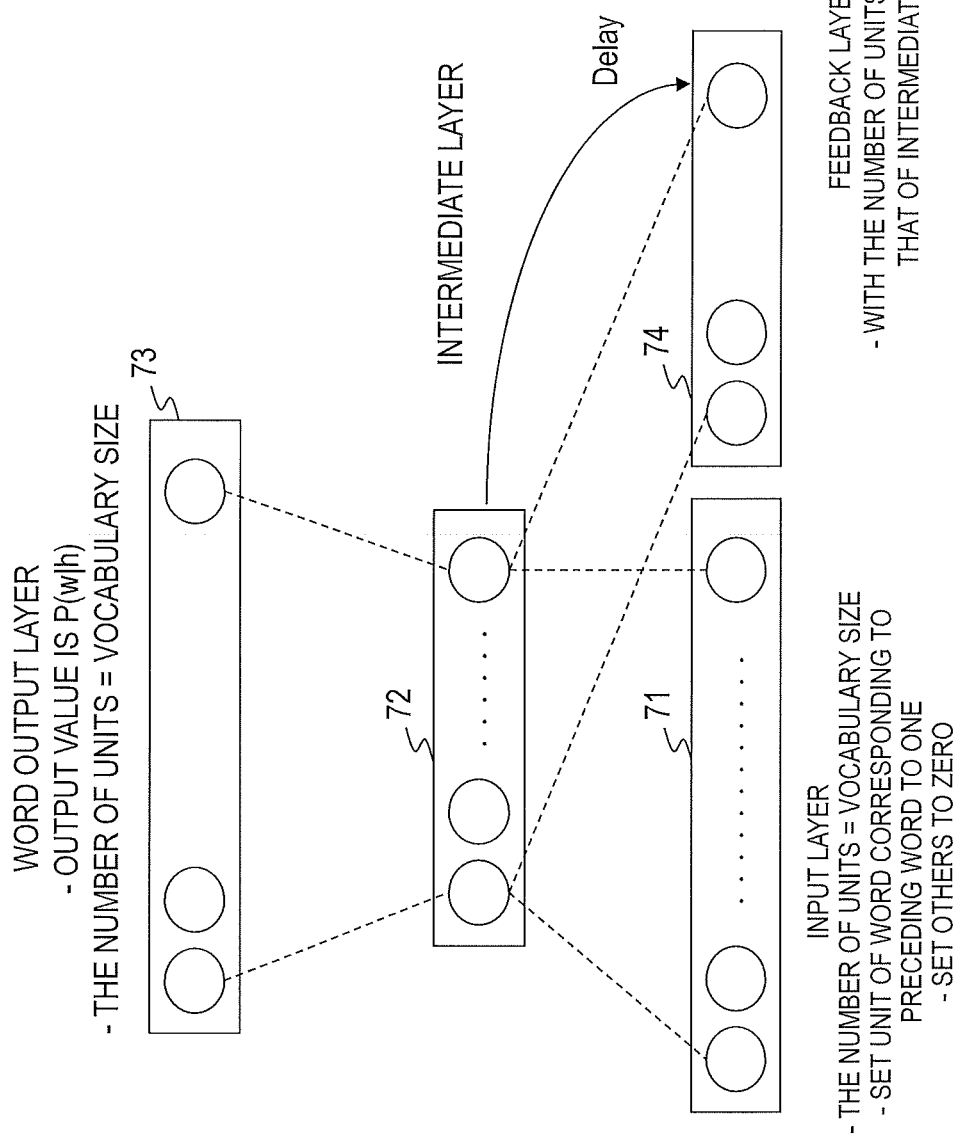
FIG. 9 shows an RNN language model.
Figure 10:
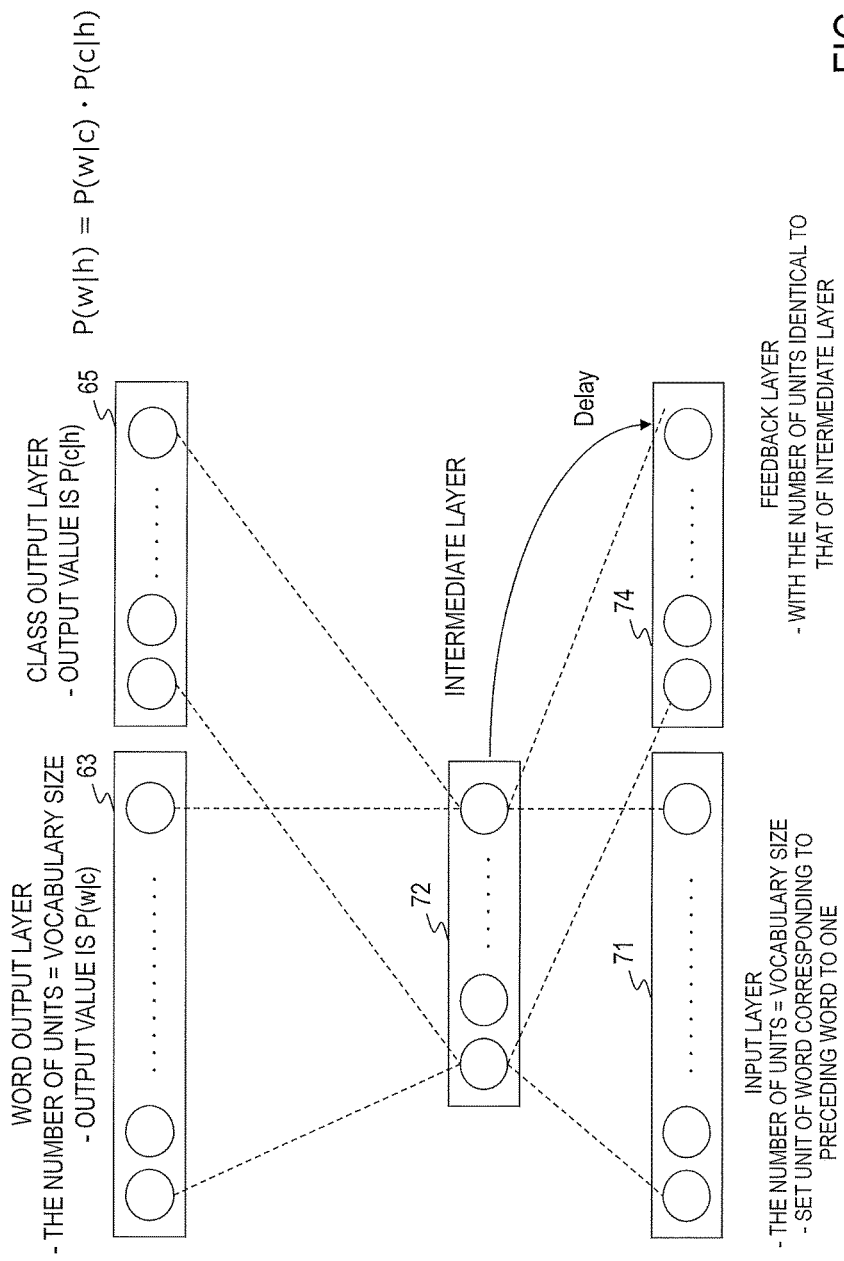
FIG. 10 shows a class RNN language model.

As the RNN language model, a class RNN language model having an object of reducing the amount of calculation with respect to the typical RNN language model (see FIG. 9) is often used (see FIG. 10).

According to the typical RNN language model, the transition probability $P(w_t|h)$ from the past word history h to the next word $w_t$ is directly provided from a unit on an output layer 73. The numbers of units on an input layer 71 and output layer 73 (word output layer) correspond to the vocabulary size. On the input layer 71, the unit value corresponding to the previous word is set to one, while the other unit values are set to zero. The number of units on a feedback layer 74 is the same as that on an intermediate layer 72. On the other hand, according to the class RNN language model, representation is independently achieved through a class output layer 65 for representing the probability $P(c_t|h)$ to the class to which each word belongs and a word output layer 63 for the output probability $P(w_t|c_t)$ from the class to each word, and $P(w_t|h)$ is approximately represented by the product of these probabilities.

Fifth Embodiment

Figure 11:
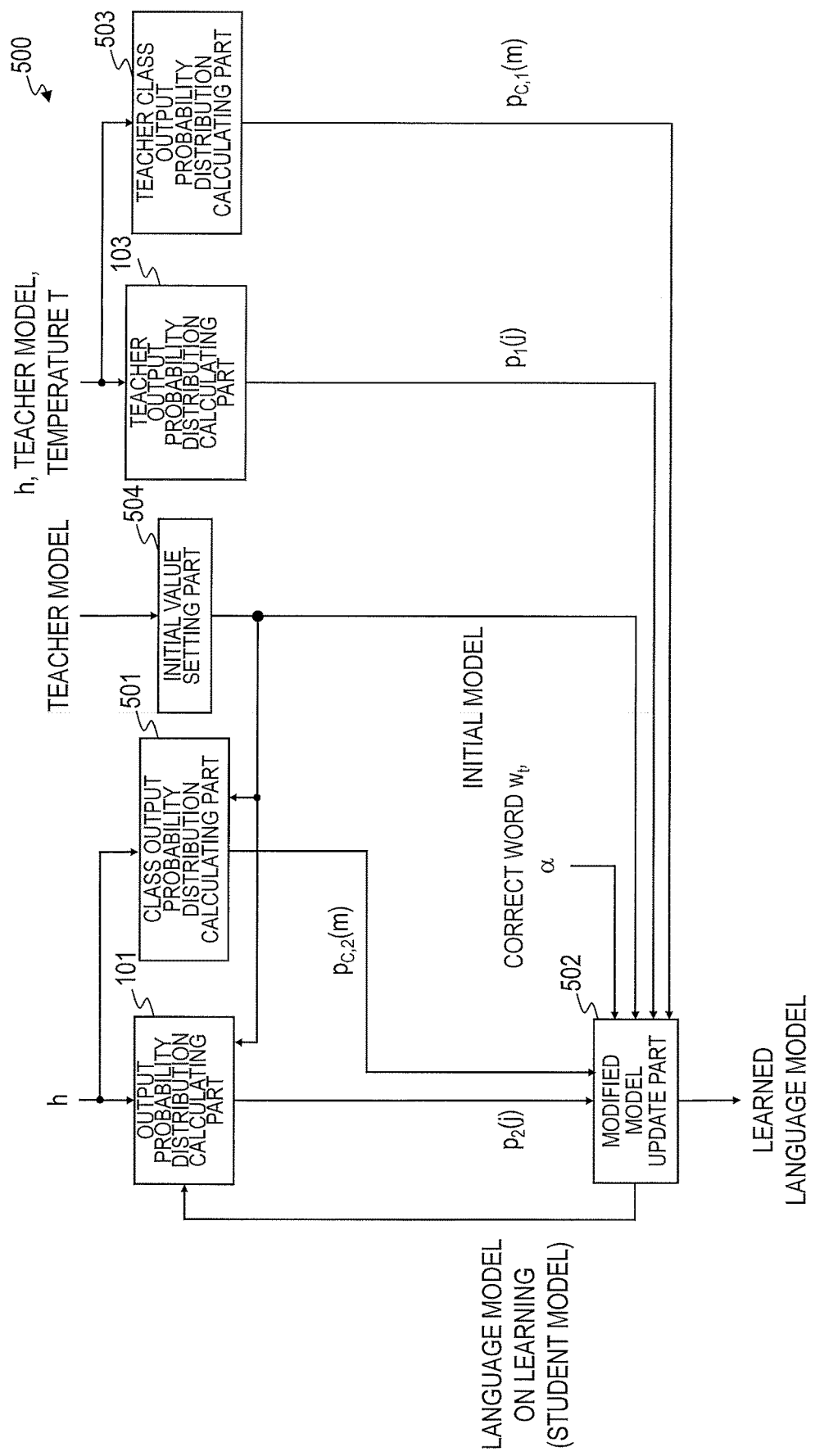
FIG. 11 is a functional block diagram of a model learning device according to a fifth embodiment.
Figure 12:
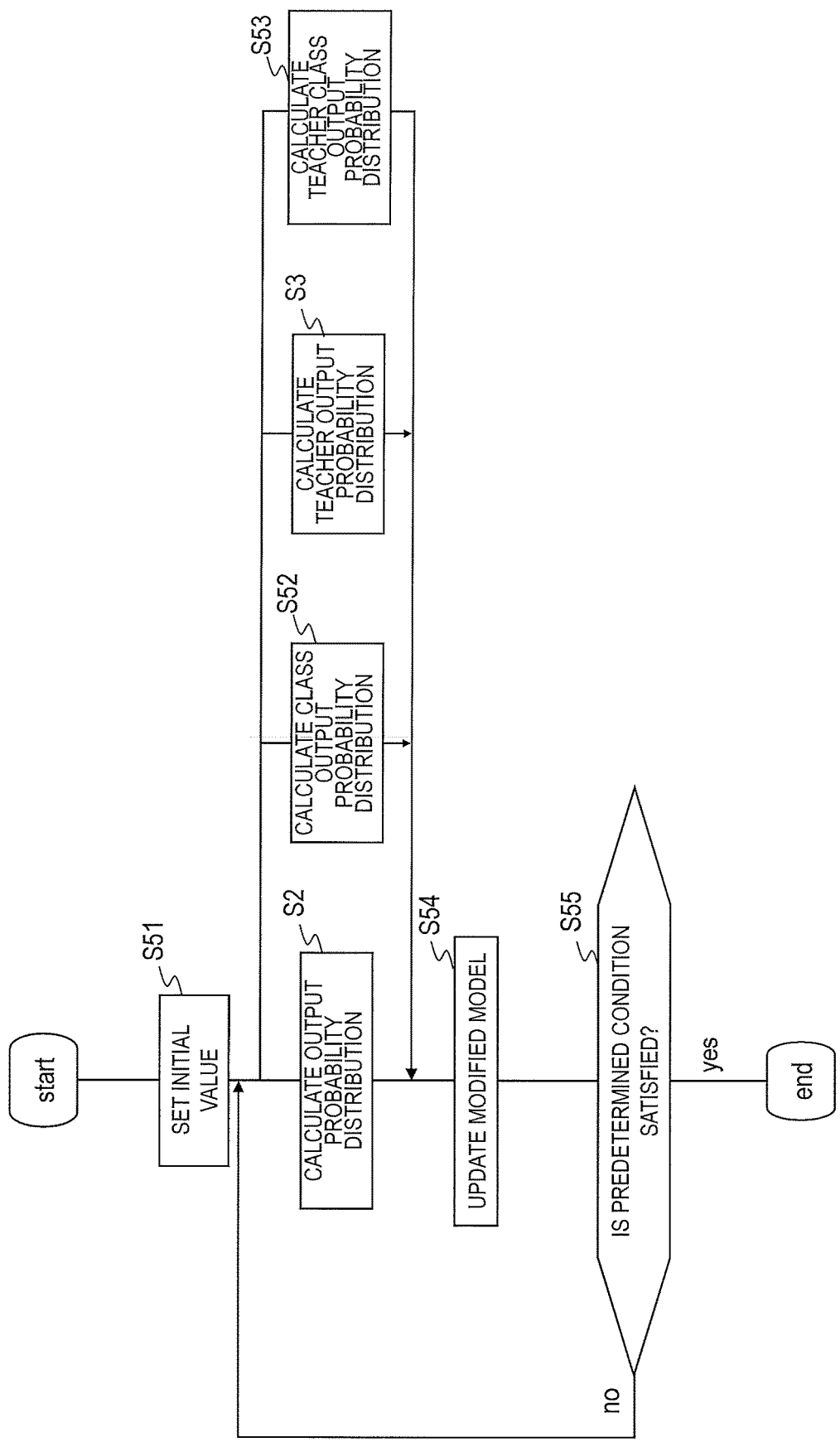
FIG. 12 shows an example of a processing flow of the model learning device according to the fifth embodiment.

FIG. 11 is a functional block diagram of a model learning device according to a fifth embodiment. FIG. 12 shows a processing flow thereof.

A model learning device 500 includes an output probability distribution calculating part 101, a class output probability distribution calculating part 501, a modified model update part 502, a teacher output probability distribution calculating part 103, a teacher class output probability distribution calculating part 503, and an initial value setting part 504. The main difference from the fourth embodiment is that instead of the RNN language model, the class RNN language model is adopted. The processes (S2 and S3) in the output probability distribution calculating part 101 and the teacher output probability distribution calculating part 103 are analogous to those in the fourth embodiment.

Initial Value Setting Part 504

Input: teacher model
Output: initial model of student model
Process: Initial value setting part 504 uses the parameters of a learned class RNN language model (teacher model) including a neural network, and sets the parameters of a class RNN language model (student model) including a neural network having a same network structure as the class RNN language model (teacher model) (S51). For example, a model that is a copy of the input parameters of the teacher model is created, and is output as the initial model of the student model. This process is performed only once at the start of learning.

<Class Output Probability Distribution Calculating Part 501>
Input: learning word history h, and student model (student model on learning, or initial model of the student model)
Output: class output probability distribution (distribution of class output probability $p_{C,2}(m)$)

The class output probability distribution calculating part 501 calculates the class output probability distribution including the distribution of the class output probability $p_{C,2}(m)$ of each unit on the class output layer, using the learning word history h and the student model (S52). Any of existing techniques may be used for the method of calculating the class output probability $p_{C,2}(m)$. The optimal technique may be appropriately selected in conformity with the use environment and the like. For example, the calculation can be achieved by the method of Reference Document 1. The class output probability $p_{C,2}(m)$ corresponds to the probability $P(c_t|h)$ to the class to which each word belongs. The output probability $p_2(j)$ calculated by the output probability distribution calculating part 101 corresponds to the output probability $P(w_t|c_t)$ from the class to each word.

<Teacher Class Output Probability Distribution Calculating Part 503>
Input: learning word history h, teacher model, and temperature T
Output: class output probability distribution (distribution of class output probability $p_{C,1}(m)$)

The teacher class output probability distribution calculating part 503 calculates the class output probability distribution including the distribution of the class output probability $p_{C,1}(m)$ of each unit on the class output layer, using the learning word history h, the teacher model and the temperature T (S53). Any of existing techniques may be used for the method of calculating the class output probability $p_{C,1}(m)$. The optimal technique may be appropriately selected in conformity with the use environment and the like. For example, the calculation can be achieved by the method of Reference Document 1. The class output probability $p_{C,1}(m)$ corresponds to the probability $P(c_t|h)$ to the class to which each word belongs. The output probability $p_1(j)$ calculated by the teacher output probability distribution calculating part 103 corresponds to the output probability $P(w_t|c_t)$ from the class to each word.

<Modified Model Update Part 502>
Input: initial model, output probability distribution of output probability $p_1(j)$, output probability distribution of output probability $p_2(j)$, output probability distribution of class output probability $p_{C,1}(m)$, output probability distribution of class output probability $p_{C,2}(m)$, correct word $w_t$, and weight α
Output: language model (student model) on learning, or the learned language model The modified model update part 502 independently obtains the cross entropy CW1 on the word output layer in the teacher model from the output probability distribution of the output probability $p_1(j)$, obtains the cross entropy CC1 on the class output layer in the teacher model from the output probability distribution of the class output probability $p_{C,1}(m)$, the cross entropy CW2 on the word output layer in the student model from the output probability distribution of the output probability $p_2(j)$, and obtains the cross entropy CC2 on the class output layer in the student model from the output probability distribution of the class output probability $p_{C,2}(m)$.

Furthermore, the modified model update part 502 obtains the cross entropies of the teacher model and the student model using the coefficient α according to the following formulae, for each of the word output layer and the class output layer.

$$CC=(1-\alpha)CC2+\alpha CC_1 \quad (13)$$

$$CW=(1-\alpha)CW2+\alpha CW1 \quad (14)$$

Lastly, the modified model update part 502 updates the parameter of the student model so as to reduce the cross entropies CC and CW (S54).

The aforementioned S2, S3, S52, S53 and S54 are repeated until a predetermined condition is satisfied (S55). When the predetermined condition is satisfied, the student model at the time is output as a learned language model.

Modified Example

According to this embodiment, the teacher output probability distribution calculating part 103 and the teacher class output probability distribution calculating part 503 adopt the temperature T as an input. However, the temperature T is not necessarily adopted. For example, the calculation can be achieved by the method of Prior Art 1 without using the temperature T. However, the teacher output probability distribution calculating part 103 and the teacher class output probability distribution calculating part 503 use the teacher model instead of the student model when obtaining $x_1$.

First Modified Example

The methods of applying the present invention to the DNN acoustic model in the first to third embodiments, to the RNN language model in the fourth embodiment, and to the class RNN language model in the fifth embodiment have been described. The present invention can be applied also to any type of machine learning that uses a neural network.

FIG. 3 is a functional block diagram of a model learning device according to a first modified example. FIG. 4 shows a processing flow thereof.

A model learning device 100 includes an output probability distribution calculating part 101, a modified model update part 102, a teacher output probability distribution calculating part 103, and an initial value setting part 104. A main difference from Prior Art 2 is that the initial value setting part 104 is added and, according to the addition, a base model (teacher model) and a learning target model (student model) are limited to have the neural network having the identical structure.

<Initial Value Setting Part 104>
Input: teacher model
Output: initial model of student model
Process: use the parameters of a learned model (teacher model) including a neural network, and set the parameters of a learning target model (student model) including a neural network having a same network structure as the model (teacher model) (S1). For example, a model that is a copy of the input parameters of the teacher model is created, and is output as the initial model of the student model. This process is performed only once at the start of learning. Prior Art 2 assumes the huge model as the teacher model and assumes the small model as the student model, while the teacher model and the student model in this embodiment have a completely identical structure. The process of the initial value setting part 104 allows a highly accurate model to be learned with smaller learning data than that in Prior Art 1.

<Output Probability Distribution Calculating Part 101>
Input: learning features Q, and student model (student model on learning, or initial model of the student model)
Output: the output probability distribution (the distribution of the output probability $p_2(j)$)

The output probability distribution calculating part 101 calculates the output probability distribution including the distribution of the output probability $p_2(j)$ of each unit on the output layer, using the features Q of data serving as a processing target of the learning target model for learning, and the student model (S2). Any of existing techniques may be used for the method of calculating the output probability $p_2(j)$. The optimal technique may be appropriately selected in conformity with the use environment and the like. For example, the calculation can be achieved by the method of Prior Art 1. In this case, first, the features Q are input into the student model, and the logit $x_j$ of the unit j on the output layer is obtained (see the following formula).

[Formula 16]

$$x_j = b_j + \sum_i y_i m_{ij} \quad (2)$$

$$y_j = \text{logistic}(x_j) = \frac{1}{1 + e^{-x_j}} \quad (3)$$

Note that logistic( ) represents a logistic function, $b_j$ is the bias of the unit j, i represents the index of the unit on a lower layer, and $m_{ij}$ represents a weight for the connection from the unit i on the lower layer to the unit j. The learning features Q are used to obtain the input of the unit j on the input layer, and the student model includes $b_j$ and $m_{ij}$.

Next, the output probability $p_2(j)$ is obtained from the logit $x_j$ (see the following formula).

[Formula 17]

$$p_2(j) = \frac{\exp(x_j)}{\sum_k \exp(x_k)} \quad (4)$$

<Teacher Output Probability Distribution Calculating Part 103>
Input: learning features Q, teacher model, and temperature T
Output: the output probability distribution (the distribution of the output probability $p_1(j)$)

The teacher output probability distribution calculating part 103 calculates the output probability distribution including the distribution of the output probability $p_1(j)$ of each unit on the output layer, using the features Q of data serving as a processing target of the learning target model for learning, teacher model and the temperature T (S3). Any of existing techniques may be used for the method of calculating the output probability $p_1(j)$. The optimal technique may be appropriately selected in conformity with the use environment and the like. For example, the calculation can be achieved by the method of Prior Art 2. In this case, the output probability $p_1(j)$ is represented by the following formula.

[Formula 18]

$$p_1(j) = \frac{\exp(x_j/T)}{\sum_k \exp(x_k/T)} \quad (5)$$

The method of calculating the logit $x_j$ is the same as that in the output probability distribution calculating part 101. However, the teacher output probability distribution calculating part 103 uses the teacher model instead of the student model. The temperature T is a preset parameter having a real value higher than zero. The higher T is set, the more closely the distribution of the output probability $p_1(j)$ approaches a uniform distribution (no information) and the smaller the degree of affecting after-mentioned update of the student model becomes. The temperature T is also called a smoothing parameter T.

<Modified Model Update Part 102>
Input: initial model, output probability distribution of output probability $p_1(j)$, output probability distribution of output probability $p_2(j)$, correct information (e.g., correct unit number $j_L$), and weight $\alpha$
Output: learning target model (student model) on learning, or the learned learning target model The modified model update part 102 calculates a loss function $C_2$ from the correct information corresponding to the learning data (corresponding to the learning features) and from the output probability $p_2(i)$ (see Formula (6)).

[Formula 19]

$$C_2 = -\sum_j d_j \log p_2(j) \quad (6)$$

Note that $d_j$ is one when j coincides with the correctness, and is zero when j does not coincide.

Next, the modified model update part 102 calculates a cross entropy $C_1$ between the output probability distribution of the output probability $p_1(j)$ and the output probability distribution of the output probability $p_2(j)$ (the total sum of the products of the logarithms of the output probability $p_1(j)$ and the output probability $p_2(j)$) (see Formula (7)).

[Formula 20]

$$C_1 = -\sum_j p_1(j) \log p_2(j) \quad (7)$$

Furthermore, the modified model update part 102 obtains the weighted sum C between the loss function $C_2$ and the cross entropy $C_1$ (see Formula (8)).

$$C = (1-\alpha)C_2 + \alpha C_1 \quad (8)$$

The weight $\alpha$ is a preset parameter ranging from 0 to 1, inclusive.

Lastly, the modified model update part 102 updates the parameter of the student model so as to reduce the weighted sum C (S4).

The aforementioned S2 to S4 are repeated until a predetermined condition is satisfied (S5). When the predetermined condition is satisfied, the student model at the time is output as a learned model.

The predetermined condition may be, for example: any of (i) a case where the number of repetitions exceeds a certain number (e.g., several tens of millions to several hundreds of millions), and (ii) a case where the update amount falls below a predetermined value, for example, (ii-a) the total sum of the update amounts of all the parameters falls below a predetermined value, or (ii-b) all the parameters or some of update amounts fall below a set predetermined value.

<Advantageous Effects>

Use of the model created in this embodiment can construct a neural network at a higher accuracy than in the prior art. Furthermore, the model can be created with learning data smaller than that in the prior art. Moreover, the time required for model learning can be reduced. Accordingly, the cost of creating the learning data on the neural network, and the cost of creating the language model can be reduced.

According to this modified example, the teacher output probability distribution calculating part 103 adopts the temperature T as an input. However, the temperature T is not necessarily adopted. For example, the calculation can be achieved by the method of Prior Art 1 without using the temperature T. However, the teacher output probability distribution calculating part 103 uses the teacher model instead of the student model when obtaining $x_j$. This modified example may be combined with any of the second, third and fifth embodiments.

In the first to third embodiments, the learning target model is the acoustic model, the features of the data serving as the processing target of the learning target model are the acoustic features, and the correct information is the correct unit number. In the fourth and fifth embodiments, the learning target model is the language model, the features of data serving as the processing target of the learning target model are the word history (word string), and the correct information is the correct word. Consequently, the first to fifth embodiments can be regarded as examples of this modified example.

The present invention is applicable to a neural network model only if the model is learned so as to reduce the loss function with respect to the teacher data by an error back propagation algorithm. For example, the present invention is applicable also to CNN (Convolutional Neural Networks) and the like. However, the present invention is not applicable to a method of learning a neural network model that uses no teacher data (unsupervised learning).

Other Modified Examples

The present invention is not limited to the embodiments and modified examples described above. For example, the various processes described above may thus be temporally executed according to the description. Alternatively, the processes may be executed in parallel or independently in conformity with the processing capability of the device that executes the processes or as required. The modification can be appropriately made in the range without departing from the spirit of the present invention.

<Program and Recording Medium>

The various processing functions in each device that have been described in the embodiments and modified examples described above may be achieved by a computer. In this case, the processing details of the functions that each device is required to have are described in a program. The program is executed by the computer, thereby allowing the various processing functions in each device to be achieved on the computer.

The program that describes the processing details can be recorded in a computer-readable recording medium. The computer-readable recording medium may be any of a magnetic recording medium, an optical disk, magnetooptical recording medium, a semiconductor memory and the like, for example.

The program is distributed by selling, assigning or lending a portable recording medium, such as a DVD or CD-ROM, for example. The program may be stored in a storage device of a server computer and then be distributed by transferring the program from the server computer to another computer via a network.

The computer for executing such a program temporarily stores, in its storage part, the program stored in the portable recording medium or transferred from the server computer. When the computer executes the process, the computer reads the program stored in its storage part and executes the process according to the read program. According to another embodiment, the computer may read the program directly from the portable recording medium and execute the process according to the program. Every time the program is transferred to the computer from the server computer, the process according to the received program may be sequentially executed. Alternatively, a configuration may be adopted that executes the process described above by a service what is called ASP (Application Service Provider), which achieves the processing functions only through execution instruction and result acquisition without transferring the program from the server computer to the computer. The program encompasses information that is provided for processes by a computer and is equivalent to a program (data or the like that is not an instruction directly to the computer but has characteristics of defining the process of the computer).

Each device is thus configured by execution of the predetermined program on the computer. Alternatively, at least some of the processing details may be achieved through hardware.

What is claimed is:

1. A model learning device, comprising
   an initial value setting part that uses a parameter of a learned first model including a neural network as a parameter of a second model including a neural network having a same network structure as the first model by copying the parameter of the learned first model;
   a first output probability distribution calculating part that calculates a first output probability distribution including a distribution of an output probability of each unit on an output layer, using features obtained from learning data and the first model;
   a second output probability distribution calculating part that calculates a second output probability distribution including a distribution of an output probability of each unit on the output layer, using features obtained from the learning data and the second model; and
   a modified model update part that calculates a second loss function from correct information corresponding to the learning data and from the second output probability distribution, calculates a cross entropy between the first output probability distribution and the second output probability distribution, obtains a weighted sum of the second loss function and the cross entropy, and updates the parameter of the second model so as to reduce the weighted sum.

2. A model learning device, comprising:
an initial value setting part that uses a parameter of a learned first acoustic model including a neural network as a parameter of a second acoustic model including a neural network having a same network structure as the first acoustic model by copying the parameter of the learned first acoustic model;
a first output probability distribution calculating part that calculates a first output probability distribution including a distribution of an output probability of each unit on an output layer, using features obtained from a learning acoustic signal and the first acoustic model;
a second output probability distribution calculating part that calculates a second output probability distribution including a distribution of an output probability of each unit on the output layer, using features obtained from a learning acoustic signal and the second acoustic model; and
a modified model update part that calculates a second loss function from a correct unit number corresponding to the learning acoustic signal and from the second output probability distribution, calculates a cross entropy between the first output probability distribution and the second output probability distribution, obtains a weighted sum of the second loss function and the cross entropy, and updates the parameter of the second acoustic model so as to reduce the weighted sum.

3. A model learning device, comprising:
an initial value setting part that uses a parameter of a learned first language model including a neural network as a parameter of a second language model including a neural network having a same network structure as the first language model by copying the parameter of the learned first language model;
a first output probability distribution calculating part that calculates a first output probability distribution including a distribution of an output probability of each unit on an output layer, using a word history that is a word string obtained from learning text data, and the first language model;
a second output probability distribution calculating part that calculates a second output probability distribution including a distribution of an output probability of each unit on the output layer, using a word history that is a word string obtained from learning text data, and the second language model; and
a modified model update part that calculates a second loss function from a correct word corresponding to the learning word history and from the second output probability distribution, calculates a cross entropy between the first output probability distribution and the second output probability distribution, obtains a weighted sum of the second loss function and the cross entropy, and updates the parameter of the second language model so as to reduce the weighted sum.

4. The model learning device according to claim 3, wherein the first language model and the second language model are each a class RNN language model,
the model learning device comprises:
a first class output probability distribution calculating part that calculates a first class output probability distribution including a distribution of an class output probability of each unit on a class output layer, using a word history that is a word string obtained from learning text data, and the first language model; and
a second class output probability distribution calculating part that calculates a second class output probability distribution including a distribution of an class output probability of each unit on a class output layer, using a word history that is a word string obtained from learning text data, and the second language model, and
the modified model update part obtains a cross entropy CW1 on the output layer from the first output probability distribution, obtains a cross entropy CC1 on the class output layer from the first class output probability distribution, obtains a cross entropy CW2 on the output layer from the second output probability distribution, obtains a cross entropy CC2 on the class output layer from the second class output probability distribution, obtains a cross entropy CW between the cross entropy CW1 and the cross entropy CW2, and a cross entropy CC between the cross entropy CC1 and the cross entropy CC2, and updates the parameter of the second language model so as to reduce values of the obtained cross entropy CW and the cross entropy CC.

5. The model learning device according to any one of claims 1 to 4,
wherein the second output probability distribution calculating part receives a smoothing parameter that is a real value larger than zero, and obtains the second output probability distribution so as to approach a uniform distribution with increase in the smoothing parameter.

6. A model learning method, comprising:
an initial value setting step of using a parameter of a learned first model including a neural network as a parameter of a second model including a neural network having a same network structure as the first model by copying the parameter of the learned first model;
a first output probability distribution calculating step of calculating a first output probability distribution including a distribution of an output probability of each unit on an output layer, using features obtained from learning data and the first model;
a second output probability distribution calculating step of calculating a second output probability distribution including a distribution of an output probability of each unit on the output layer, using features obtained from the learning data and the second model; and
a modified model update step of calculating a second loss function from correct information corresponding to the learning data and from the second output probability distribution, of calculating a cross entropy between the first output probability distribution and the second output probability distribution, of obtaining a weighted sum of the second loss function and the cross entropy, and of updating the parameter of the second model so as to reduce the weighted sum.

7. The model learning method according to claim 6, wherein the second output probability distribution calculating step receives a smoothing parameter that is a real value larger than zero, and obtains the second output probability distribution so as to approach a uniform distribution with increase in the smoothing parameter.

8. A non-transitory computer-readable recording medium that records a program for causing a computer to function as the model learning device according to any of claims 1 to 4.

9. A non-transitory computer-readable recording medium that records a program for causing a computer to function as the model learning device according to claim 5.

10. A model learning device, comprising
an initial value setting part that uses a parameter of a learned first model including a neural network as a parameter of a second model including a neural network having a same network structure as the first model by copying the parameter of the learned first model;
a first output probability distribution calculating part that calculates a first output probability distribution including a distribution of an output probability of each unit on an output layer, using features obtained from learning data and the first model;
a second output probability distribution calculating part that calculates a second output probability distribution including a distribution of an output probability of each unit on the output layer, using features obtained from the learning data and the second model; and
a modified model update part that updates the parameter of the second model based on the second output probability distribution, the first output probability distribution, and correct information corresponding to the learning data.

11. A model learning method, comprising:
an initial value setting step of using a parameter of a learned first model including a neural network as a parameter of a second model including a neural network having a same network structure as the first model by copying the parameter of the learned first model;
a first output probability distribution calculating step of calculating a first output probability distribution including a distribution of an output probability of each unit on an output layer, using features obtained from learning data and the first model;
a second output probability distribution calculating step of calculating a second output probability distribution including a distribution of an output probability of each unit on the output layer, using features obtained from the learning data and the second model; and
a modified model update step of updating the parameter of the second model based on the second output probability distribution, the first output probability distribution, and correct information corresponding to the learning data.

* * * * *